Mar. 27, 1923. 1,450,006.
G. MORE.
HOSE REEL.
FILED SEPT. 14, 1922.

Inventor
George More
By Fetherstonhaugh & Co.
his Attorney

Patented Mar. 27, 1923.

1,450,006

UNITED STATES PATENT OFFICE.

GEORGE MORE, OF BROOKLYN, NEW YORK.

HOSE REEL.

Application filed September 14, 1922. Serial No. 588,214.

*To all whom it may concern:*

Be it known that I, GEORGE MORE, a citizen of the United States, residing at 100 Rutledge Street, in the borough of Brooklyn, county of Kings, and State of New York, have invented certain new and useful Improvements in Hose Reels, of which the following is a clear and exact specification.

This invention relates to a combined portage device and hose reel, and my improvement is particularly directed to a hose reel of novel construction whereby it is adapted to be detachably attached to a portage device for support while in service and to render it capable of being moved about from place to place.

The portage device employed by me, which is the subject of my earlier United States Patents Nos. 1,155,081, 1,380,073 and 1,428,180, is in the form of a wheeled, hand truck, having upper and lower engaging means for an article to be supported and transported thereby; and the hose reel is composed of rod material bent into the form of a frame, with bearings for the reel shaft, forward surface contacting members, for support, and rearward, compressible members for tensional engagement with the upper and lower engaging means of the truck.

Other features and advantages of my invention will hereinafter appear.

In the drawing:—

Figure 1:
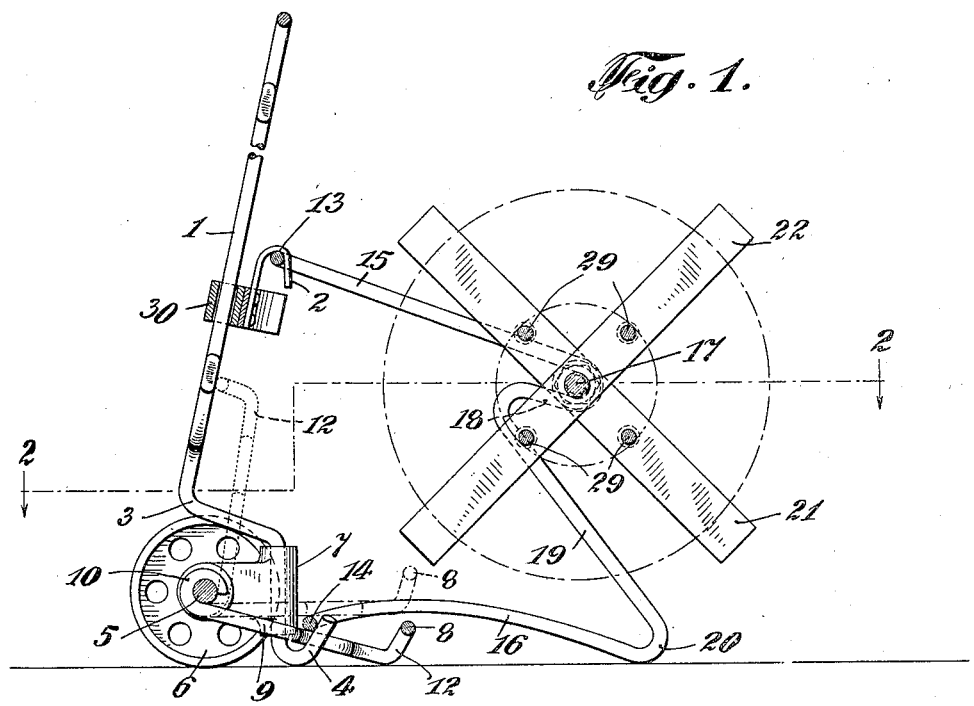
Figure 1 is a side sectional elevation, taken on the line 1—1 of Fig. 2.
Figure 2:
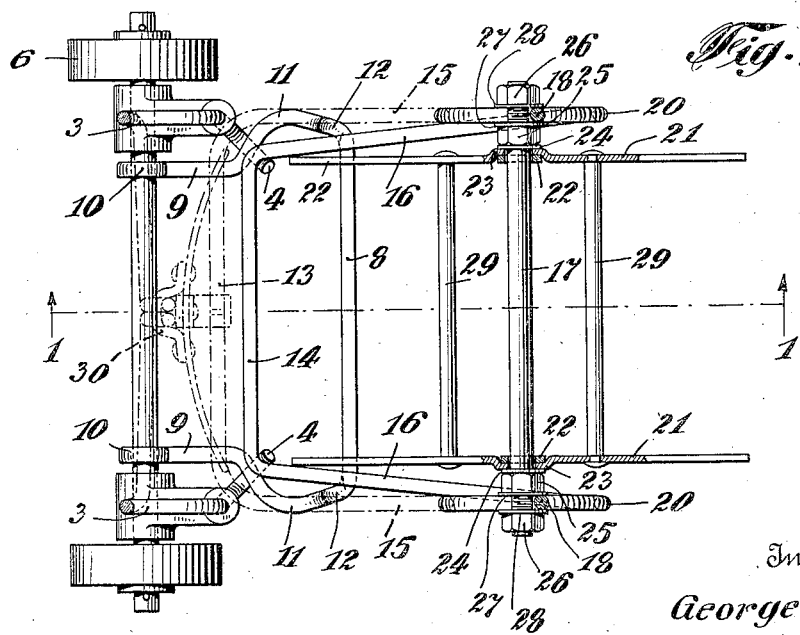
Fig. 2 is a horizontal sectional view, taken on the line 2—2 of Fig. 1.

In said figures the truck structure comprises the handle portion 1, which carries the slidable, article engaging member 2, the frame portion composed of the members 3, 3, that terminate, respectively, in the upturned, hook members 4, 4, to serve as supports for an ash can, barrel or other article; the axle 5, carrying the wheels 6, 6, and the fittings 7, 7, which respectively constitute engaging members for the axle, and engaging means for the frame members 3, 3.

The hook members 4, 4, which extend out forwardly of the device, are adapted to have contact with a supporting surface when the truck is in an upright position, and these members, being in advance of the wheels 6, 6, are thus capable of constituting, with the wheels, standards which permit the truck to maintain an upright position. Also, these hook members, which for example may be of rod like material, are angled inwardly from their respective fittings 7, 7, as thereby the base or article supporting portions of the hook members have approximately radial relation to the ash can, barrel or other article which they are to hold.

This angled arrangement of the hook members 4, 4, also fulfills other functions in the development of my invention as will appear.

Oscillably mounted on the axle 5 is a foot piece that is adapted to be either extended forwardly from or folded against the truck frame. This foot piece may be composed of rod material, having the forward portion 8, which is in parallelism with axle 5, and the side arms 9, 9, whose ends are shaped into socket like members 10, 10, that revolubly engage the axle, to thereby permit swinging movement to the foot piece.

The arms 9, 9, extend out from axle 5 at right angles thereto for a portion of their length, thence each having an outwardly angled formation 11, of approximate V-shape, wherefrom the arms respectively communicate with the portion 8, by elbow like formations 12, 12, that hold portion 8 in advance of the plane occupied by the arms 9, 9.

On account of the particular structural form of the foot piece it is enabled with its straight arm portions 9, 9, to swing within the compass of the fittings 7, 7, and with its angled portions 11, 11, to lie out upon the base portions of the hooks, 4, 4, which thereby hold the foot piece in operative position for supporting a trunk, box or other article.

It will be noted that the portion 8 of the foot piece, when the latter is extended for service, occupies a plane above the plane of the arms, and is therefore in a position where it is suited, as a rail, to comprise lodgement means for a trunk, box or other article that may be imposed upon the truck for portage purposes.

When the foot piece is required to be out of service, so that the truck may be adapted for the purpose of hauling ash cans, barrels or other articles requiring the use of hooks 4, 4, as the engaging means, then the foot piece is to be swung back against the truck frame, as shown in dotted lines, Fig. 1. In this position the angled portions 11, 11 of arms 9, 9, engage with the frame members 3, 3; which constitute a back stop therefor, the rail portion 8 of the foot piece, in this position, being capable of protruding rearwardly through the frame, so that it will not prevent the foot piece from lying flat against the frame, which it should do to enable the device to be used for the portage of ash cans, barrels or other articles, because if the foot piece, when folded back, projected forwardly of the farme, it would interfere with the coordinated function of the frame and hooks 4, 4, in seating an ash can, barrel or other article.

Having now described the structural features of the portage device which is employed with my present invention, I will proceed to describe my improved hose reel, which has been devised to co-act with said portage device, as a complement thereof. The frame of the hose reel is composed of a continuous or joined length of rod material which is bent to provide the spaced, upper and lower horizontal portions 13, 14, the portion 13 having the rearwardly extended portions 15, 15; and the portion 14 having the rearwardly extended portions 16, 16.

The portions 15, 15 each have a sharp return bend, to provide sockets or bearings for the shaft 17 of the hose reel, the return bend lengths 18 of the rod material being relatively short, and each continuing into an outwardly bent portion 19, that communicates, by a return bend 20 with the portion 16 respectively.

The respective sides of the reel are composed each of the crossed arms 21, 22, which are mounted on shaft 17, the arms 21 each having a central depression 23 to receive an arm 22, so that each pair of arms 21, 22 may be in the same vertical plane. Washers 24 are placed on shaft 17, outside arms 21; and complementary nuts 25, 26, with respective washers 27, 28, are also placed upon shaft 17, embracing the bend 18 which forms the socket or bearing for said shaft, to secure it in place. The arms are provided with the equi-distant transversely disposed rods 29, that form the reel seat upon which hose is to be wound in the usual manner.

It will be noted that the bends 20 serve as forward supporting legs for the reel, and that the rod portions 13, 14 respectively are adapted to have detachable engagement with the portage device, when the latter is in an upright position, for rearward support of the reel frame.

Thus, the rod portion 13 is adapted to be engaged by the hook 2, which extends from a member 30 that is slidably adjustable upon the handle 1; while the rod portion 14 is adapted to be seated within the hooks 4.

In Fig. 1 the foot piece is shown in full lines as extended forwardly of the truck with the rod portion 14 lying upon said foot piece within hooks 4; but the foot piece is also shown in dotted lines as lying upon the rod portion 14, to thereby lock the latter in its seated position within hooks 4.

The hose reel frame being constituted of rod material is of resilient character, so that the rod portions 13 and 14 may be pressed toward each other to enable them to be engaged under tension respectively by the hook 2 and hooks 4.

With the hose reel frame connected to the portage device in the manner indicated, the latter may be tilted when it is desired to trundle the hose reel from place to place; and, when in a desired place for service, the combined apparatus may be caused to stand on the base provided by the truck wheels and the bends 20 of the hose reel frame.

Variations within the spirit and scope of my invention are equally comprehended by the foregoing disclosure.

I claim:—

1. The combination with a portage device comprising a frame, having supporting wheels and a handle, of engaging means extended respectively from the frame and handle; together with a hose reel, having a frame composed of bent rod material, with upper and lower rearward portions adapted to be sprung into engagement respectively with the engaging means on the portage device, and with bends to serve as forward support.

2. A hose reel comprising a frame of bent material, including upper and lower horizontal rod portions in vertically spaced relation, said rod portions each having forwardly extended portions, whereof the upper portions are provided with short return bends, forming sockets, a shaft mounted in said sockets, securing means therefor, intersecting reel arms, carrying a hose bearing, mounted on said shaft, and the forward extensions of the lower horizontal rod portion having bends which constitute forward supports and that form continuations of said short return bends.

Signed at the borough of Manhattan, in said city, county, and State of New York, this 7th day of September, 1922.

GEORGE MORE.